(12) United States Patent
Rogers

(10) Patent No.: US 11,114,734 B2
(45) Date of Patent: Sep. 7, 2021

(54) WAVEGUIDE TO PLANAR SURFACE INTEGRATED WAVEGUIDE AND PLANAR STRIPLINE TRANSITIONS

(71) Applicant: The Boeing Company, Chicago, IL (US)

(72) Inventor: John E. Rogers, Owens Cross Roads, AL (US)

(73) Assignee: THE BOEING COMPANY, Chicago, IL (US)

( * ) Notice: Subject to any disclaimer, the term of this patent is extended or adjusted under 35 U.S.C. 154(b) by 83 days.

(21) Appl. No.: 16/592,015

(22) Filed: Oct. 3, 2019

(65) Prior Publication Data

US 2021/0104806 A1    Apr. 8, 2021

(51) Int. Cl.
*H01P 5/08*    (2006.01)
*G02B 6/12*    (2006.01)
*H01P 3/08*    (2006.01)

(52) U.S. Cl.
CPC ............... *H01P 5/085* (2013.01); *G02B 6/12* (2013.01); *H01P 3/081* (2013.01)

(58) Field of Classification Search
CPC .......... H01P 3/121; H01P 5/107; H01P 3/082; H01P 5/085; H01P 3/081; G02B 6/12
USPC .......................................................... 333/33
See application file for complete search history.

(56) References Cited

U.S. PATENT DOCUMENTS

2017/0040703 A1* 2/2017 Cheng ................. H01Q 13/106
2020/0303799 A1* 9/2020 Wang ..................... H01P 1/047
2020/0395667 A1* 12/2020 Rogers .................... H01Q 1/38

OTHER PUBLICATIONS

Noriaki Kaneda et al; A Broadband Microstrip-to-Waveguide Transition Using Quasi-Yagi Antenna (IEEE MTT-S '99) (1999).
Dominic Deslandes et al; Integrated Microstrip and Rectangular Waveguide in Planar Form (IEEE Microwave and Wireless Components Letters, vol. 11, No. 2, Feb. 2001.
Dominic Deslandes and Ke Wu; Integrated Transition of Coplanar to Rectangular Waveguides (IEEE MTT-S '01) (2001).
Cheng-Jung Lee et al; A Broadband Microstiup-to-Waveguide Transition Using Planar Technique (APMC2001) (2001).
Rosine Valois et al; High Performances of Shielded LTCC Vertical Transitions From DC up to 50 GHz (IEEE MTT '05) Jun. 6, 2005.
L. Xia et al; Broadband transition between air-filled waveguide and substrate integrated waveguide (Electronic Letters 06) Nov. 23, 2006.

(Continued)

*Primary Examiner* — Robert J Pascal
*Assistant Examiner* — Kimberly E Glenn
(74) *Attorney, Agent, or Firm* — Parsons Behle & Latimer

(57) ABSTRACT

An apparatus may include a substrate assembly having a first side and a second side. The apparatus may further include a waveguide antenna element positioned on the first side of the substrate assembly. The apparatus may also include a microstrip line positioned within the substrate assembly, where the waveguide antenna element overlaps the microstrip line. The apparatus may include a first conductive plane positioned on the first side of the substrate assembly. The apparatus may further include a second conductive plane positioned on the second side of the substrate assembly. The first conductive plane and the second conductive plane may define at least a portion of a planar surface integrated waveguide or a planar stripline.

20 Claims, 14 Drawing Sheets

(56) References Cited

OTHER PUBLICATIONS

Lin Li et al; A Transition from Substrate Integrated Waveguide (SIW) to Rectangular Waveguide (APMC '09) (2009).
Haiyan Jin et al; Broadband transition between waveguide and substrate integrated waveguide based on quasi-Yagi antenna (IEEE Electronics Letters '12) Mar. 29, 2012.

* cited by examiner

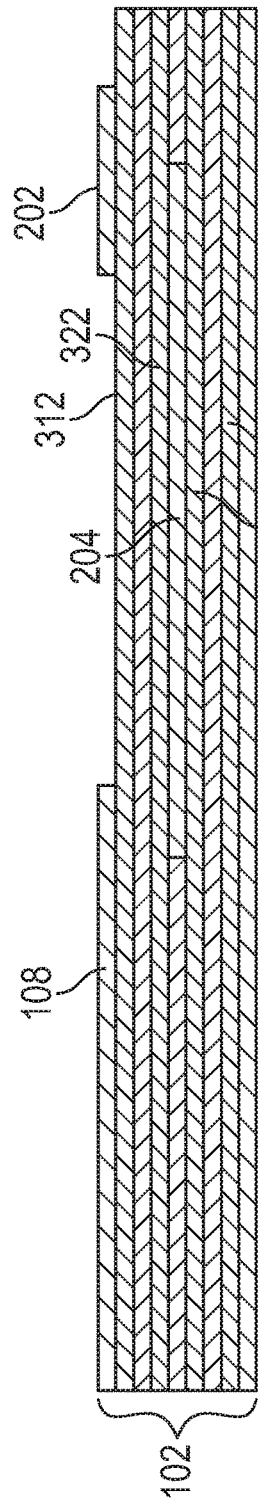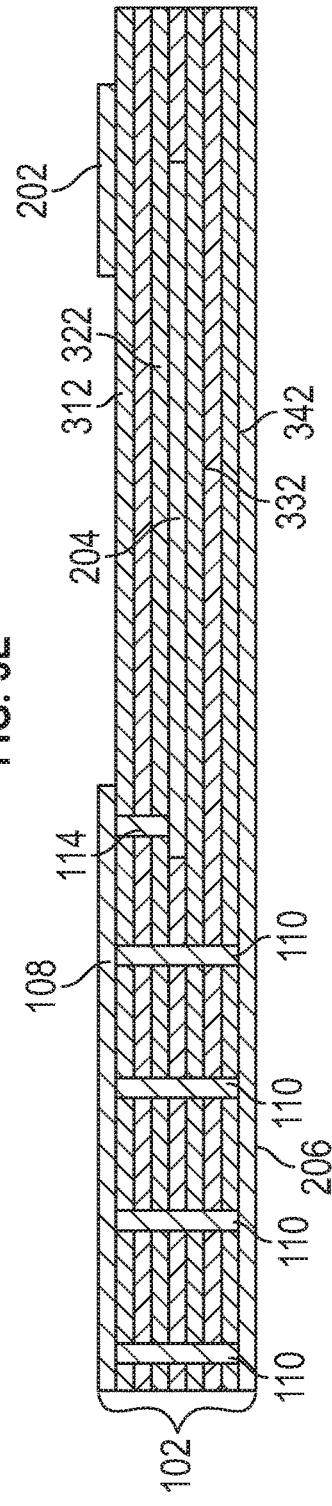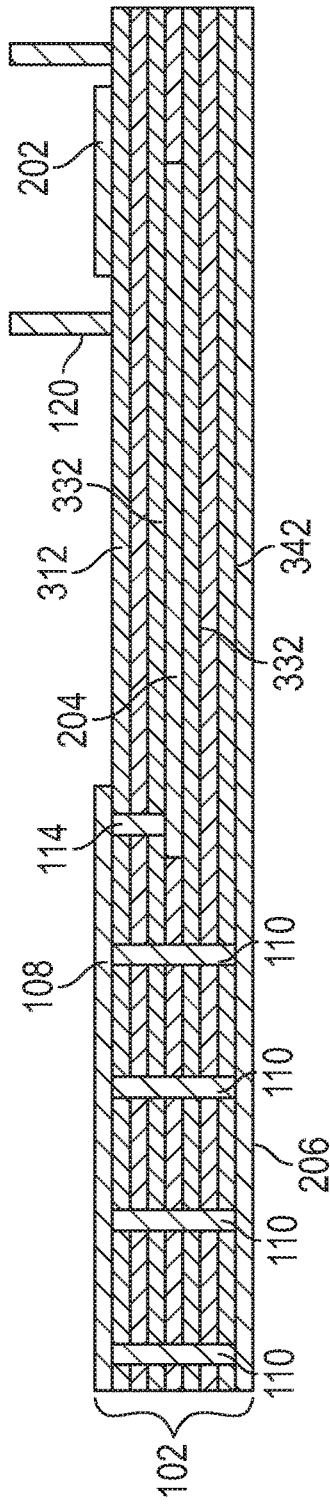

WAVEGUIDE TO PLANAR SURFACE INTEGRATED WAVEGUIDE AND PLANAR STRIPLINE TRANSITIONS

FIELD OF THE DISCLOSURE

This disclosure is generally related to the field of waveguide to transmission device transitions and, in particular, to waveguide to planar surface integrated waveguide and planar stripline transitions.

BACKGROUND

Waveguides are used in many radio frequency (RF) applications for low-loss signal propagation. For high-frequency applications in particular, waveguides may be preferred over coaxial transmission lines. In some applications, it may be desirable to transition waveguides to planar surface integrated waveguides or to striplines. Planar striplines may be useful for signal transmission to various components on an RF board.

In order for a waveguide to transition to another waveguide or to a planar stripline, multiple adapters are typically required. First, a waveguide-to-coax adapter may transition a waveguide to a coax. Second, a coax-to-microstrip adapter may transition a coax to a microstrip. Finally, the microstrip may be transitioned to a planar surface integrated waveguide or to a planar stripline on an RF board. Adapters associated with these transitions can be cost prohibitive at higher frequencies because such adapters are small and may be formed using high-precision machining. Also, the size and weight of existing waveguide-to-coax transitions may make them non-ideal for many applications.

SUMMARY

In this disclosure, a low-loss waveguide to stripline feed apparatus is described. In an embodiment an apparatus includes a substrate assembly having a first side and a second side. The apparatus further includes a waveguide antenna element positioned on the first side of the substrate assembly. The apparatus also includes a microstrip line positioned within the substrate assembly, where the waveguide antenna element overlaps the microstrip line. The apparatus includes a first conductive plane positioned on the first side of the substrate assembly and a second conductive plane positioned on the second side of the substrate assembly. The apparatus also includes a first plurality of electrical vias electrically shorting the first conductive plane and the second conductive plane and a second plurality of electrical vias electrically shorting the first conductive plane and the second conductive plane, where the first conductive plane, the second conductive plane, the first plurality of electrical vias, and the second plurality of electrical vias define a surface integrated waveguide, and where the microstrip line is electrically connected to the surface integrated waveguide.

In some embodiments, the microstrip line is electrically connected to the first conductive plane, the second conductive plane, or both. In some embodiments, the first plurality of electrical vias are linearly arranged along a first plane and the second plurality of electrical vias are linearly arranged along a second plane, where the first plane and the second plane are both perpendicular to the first conductive plane and the second conductive plane, respectively, to define a rectangular surface integrated waveguide. In some embodiments, the microstrip line is configured to propagate a signal having a predetermined operating wavelength, where the first plurality of electrical vias are spaced approximately ⅛ to ¹⁄₁₀ of the operating wavelength from each other, and where the second plurality of electrical vias are spaced approximately ⅛ to ¹⁄₁₀ of the operating wavelength from each other. In some embodiments, the waveguide antenna element is proximity coupled to the microstrip line. In some embodiments, the apparatus includes a waveguide attached to the first side of the substrate assembly and enclosing the waveguide antenna element. In some embodiments, the waveguide antenna element and the first conductive plane are positioned on a first substrate of the substrate assembly, the microstrip line is positioned on a second substrate of the substrate assembly, and the second conductive plane is positioned on a third substrate of the substrate assembly.

In an embodiment, an apparatus includes a substrate assembly having a first side and a second side. The apparatus further includes a waveguide antenna element positioned on the first side of the substrate assembly. The apparatus also includes a microstrip line positioned within the substrate assembly, where the waveguide antenna element overlaps the microstrip line. The apparatus includes a stripline positioned within the substrate assembly and electrically connected to the microstrip line. The apparatus further includes a first conductive plane positioned on the first side of the substrate assembly and overlapping the stripline and a second conductive plane positioned on the second side of the substrate assembly and overlapping both the microstrip line and the stripline.

In some embodiments, the apparatus includes a notch defined in the first conductive plane, the notch proximate to a junction between the stripline and the microstrip line, where the notch performs impedance matching functions between the stripline and the microstrip line to minimize signal loss. In some embodiments, the apparatus includes at least one electrical via electrically shorted to the first conductive plane, the second conductive plane, or both, the at least one electrical via proximate to a junction between the stripline and the microstrip line, where the at least one electrical via performs impedance matching functions between the stripline and the microstrip line to minimize signal loss. In some embodiments, the apparatus includes a plurality of electrical vias electrically shorting the first conductive plane to the second conductive plane. In some embodiments, the waveguide antenna element is proximity coupled to the microstrip line. In some embodiments, the apparatus includes a waveguide attached to the first side of the substrate assembly and enclosing the waveguide antenna element. In some embodiments, the waveguide antenna element and the first conductive plane are positioned on a first substrate of the substrate assembly, the microstrip line and the stripline are positioned on a second substrate of the substrate assembly, and the second conductive plane is positioned on a third substrate of the substrate assembly.

In an embodiment, a method includes forming a waveguide antenna element and a first conductive plane on a first substrate. The method further includes forming a microstrip line on a second substrate. The method also includes forming a second conductive plane on a third substrate. The method includes assembling at least the first substrate, the second substrate, and the third substrate to form a substrate assembly, where the substrate assembly defines a transmission device, and where the microstrip line is electrically connected to the transmission device.

In some embodiments, the transmission device is a surface integrated waveguide. In some embodiments, the method includes forming a first plurality of electrical vias electrically shorting the first conductive plane and the second conductive plane, forming a second plurality of electrical vias electrically shorting the first conductive plane and the second conductive plane, where the first conductive plane, the second conductive plane, the first plurality of electrical vias, and the second plurality of electrical vias define the surface integrated waveguide, and electrically shorting the microstrip line to the first conductive plane, the second conductive plane, or both. In some embodiments, the transmission device is a stripline. In some embodiments, the method includes forming the stripline on the second substrate, where the stripline is electrically connected to the microstrip line, forming a notch in the first conductive plane proximate to a junction of the stripline and the microstrip line, and forming one or more electrical vias proximate to the junction of the stripline and the microstrip line. In some embodiments, the method includes attaching a waveguide to the substrate assembly, where the waveguide is configured to receive a signal and convert the signal for transmission via the transmission device.

BRIEF DESCRIPTION OF THE DRAWINGS

FIG. 3E is a schematic cross-sectional view of an example of a first substrate, second substrate, third substrate, and an optional fourth substrate bonded together to form a substrate assembly.

FIG. 3F is a schematic cross-sectional view of an embodiment of a waveguide to planar surface integrated waveguide substrate assembly.

FIG. 3G is a schematic cross-sectional view of an embodiment of a waveguide to planar surface integrated waveguide substrate assembly.

Figure 1:
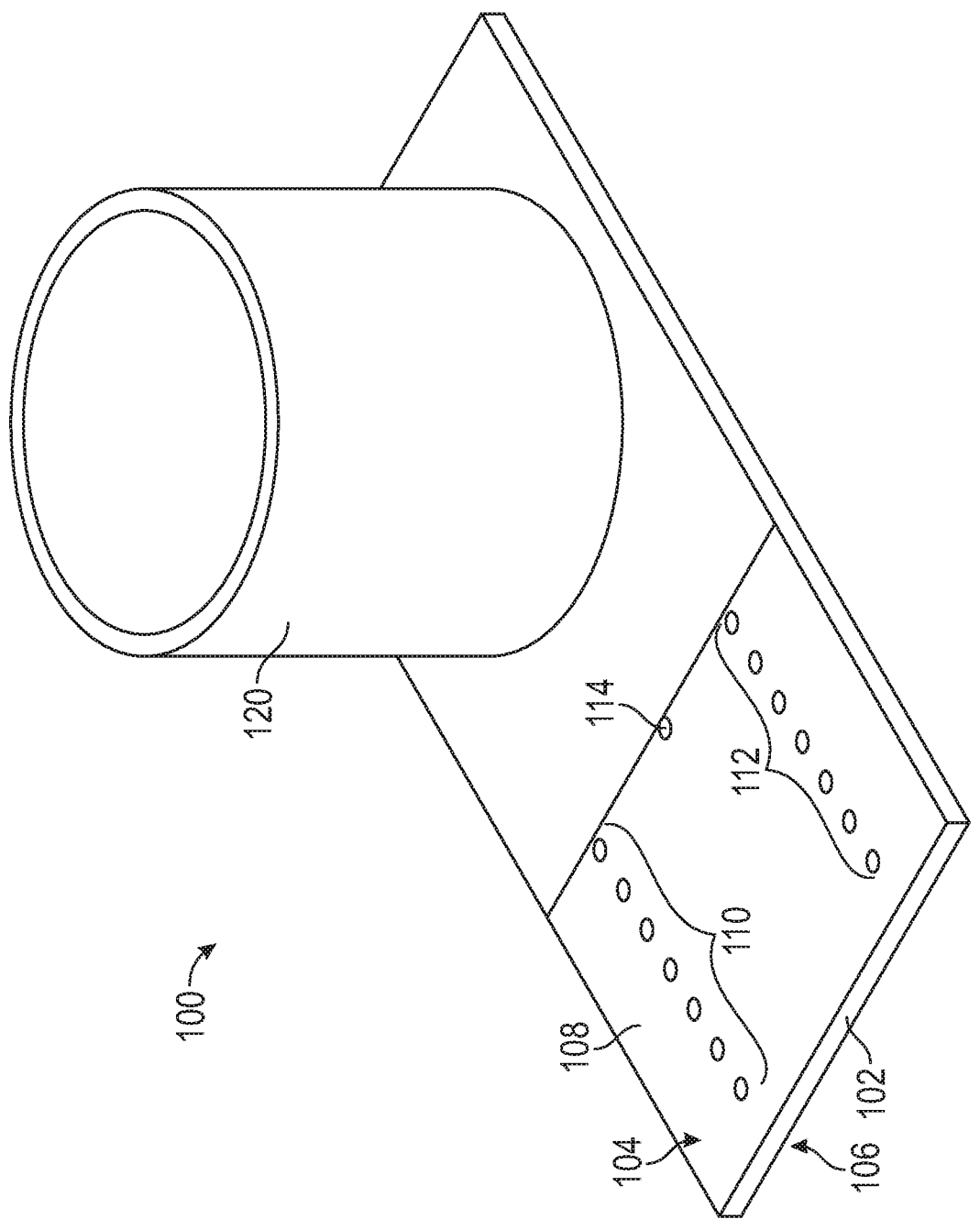
FIG. 1 is a schematic perspective view of an embodiment of a waveguide to planar surface integrated waveguide apparatus.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

As used herein, the terms "top," "bottom," "first," and "second" can refer to relative directions or positions of features in the apparatus shown in the figures. The term "overlap" may refer to a layer covering another layer when viewed from a "top" or "bottom" view. These terms, however, should be construed broadly to include apparatus having other orientations, such as inverted or inclined orientations where top/bottom, over/under, above/below, up/down, and left/right can be interchanged depending on the orientation.

Figure 2:
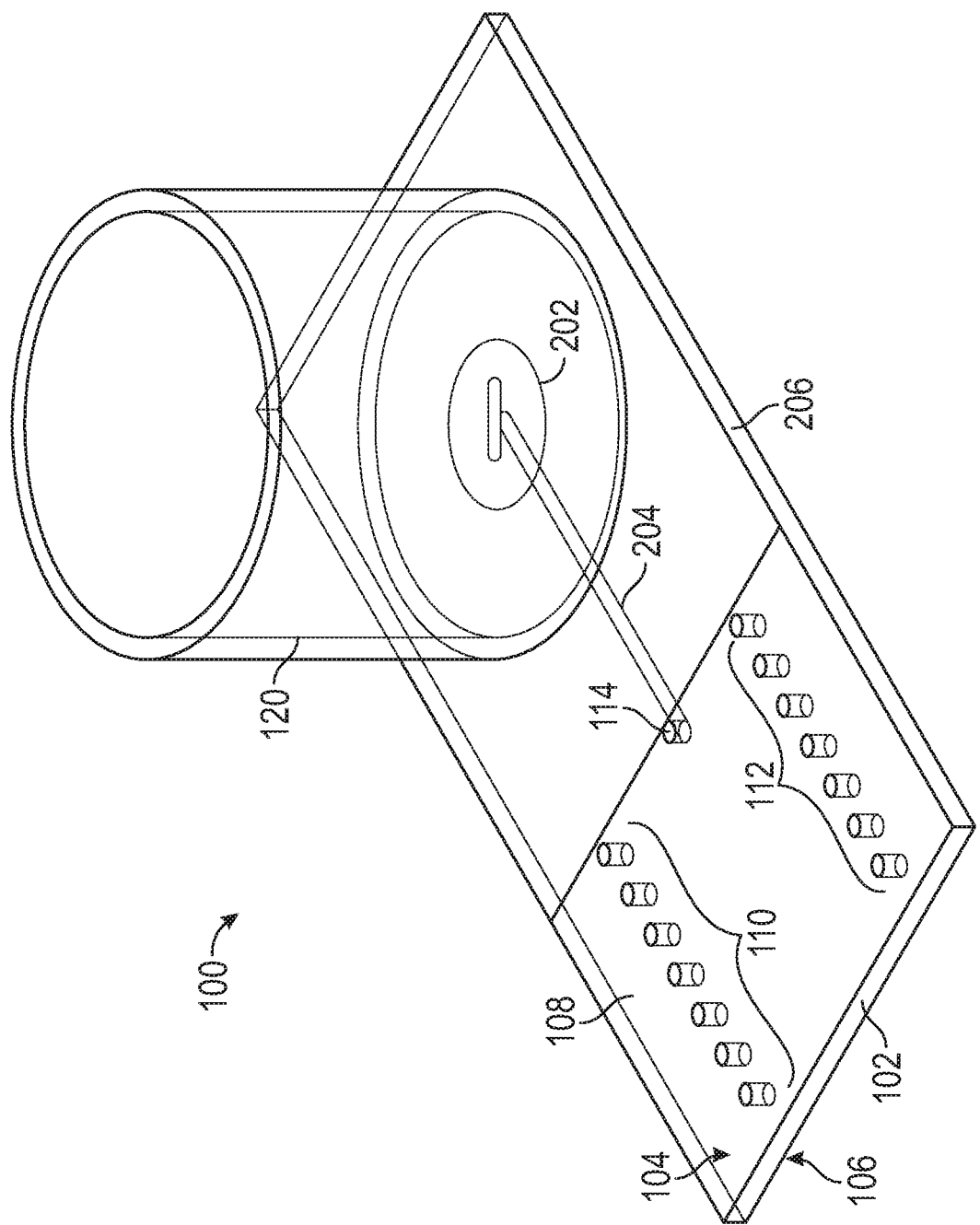
FIG. 2 is a transparent schematic perspective view of an embodiment of a waveguide to planar surface integrated waveguide apparatus.

Referring to FIGS. 1 and 2, an embodiment of a waveguide to planar surface integrated waveguide apparatus 100 is depicted. The apparatus 100 may include a substrate assembly 102 having a first side 104 and a second side 106. Features positioned on the first side 104 of the substrate assembly 102 may be described with reference to FIG. 1. Features positioned within the substrate assembly 102 or on the second side 106 of the substrate assembly 102 may be described with reference to FIG. 2.

Referring to FIG. 1, on the first side 104 of the substrate assembly 102, the apparatus 100 may include a first conductive plane 108. A waveguide 120 may also be attached to the first side 104 of the apparatus 100. The waveguide 120 may transition to a microstrip line within the substrate assembly 102 as described further herein. The first conductive plane 108 may cover a portion of the first side 104 of the substrate assembly 102 and may be used as a portion of a planar surface integrated waveguide as described herein. A first plurality of electrical vias 110 and a second plurality of electrical vias 112 may be formed within the substrate assembly 102, as well as a connection via 114.

Referring to FIG. 2, the apparatus may include a waveguide antenna element 202. The waveguide antenna element 202 may be a circular waveguide antenna element and may enable a current with circular behavior in response to reception of a signal at the waveguide antenna element 202. The waveguide 120 may be positioned on the first side 104 of the substrate assembly 102 enclosing the waveguide antenna element 202. As used herein, "enclosing" means that the waveguide 120 surrounds the waveguide antenna element 202 along a plane as shown in FIG. 2. Although FIGS. 1 and 2 depict the waveguide 120 as a circular waveguide, other shapes, e.g., rectangular, are also possible. Further, the waveguide antenna element 202 may also be other shapes, e.g., rectangular. The waveguide antenna element 202 may also not include a slot.

The apparatus 100 may include a microstrip line 204 within the substrate assembly 102. The microstrip line 204 may be proximity coupled to the waveguide antenna element 202. In other words, the microstrip line 204 may be capacitively coupled with the waveguide antenna element 202 such that a time-varying electrical voltage within the waveguide antenna element 202 may induce a time-varying electrical current within the microstrip line 204 at frequencies within a predetermined frequency band.

On the second side 106 of the substrate assembly 102, the apparatus 100 may include a second conductive plane 206. As persons of skill in the art, having the benefit of this disclosure, would recognize, microstrip lines, in general, are associated with an overlapping reference ground plane on only one side of the microstrip line. In the apparatus 100, the microstrip line 204 may use the second conductive plane 206 acting as a reference ground plane. In order to ensure proper microstrip line functionality, the first conductive plane 108 may be non-overlapping with most of the microstrip line 204.

The first conductive plane 108, the second conductive plane 206, the first plurality of electrical vias 110, and the second plurality of electrical vias 112 may define a surface integrated waveguide. The microstrip line 204 may be electrically connected to the surface integrated waveguide through the connection via 114. As shown in FIG. 2, the connection via 114 may electrically short the microstrip line 204 to the first conductive plane 108. In other embodiments, the connection via 114 may electrically short the microstrip line 204 to the second conductive plane 206 or both the first conductive plane 108 and the second conductive plane 206.

A benefit of the apparatus 100 is that it may have a reduced size, weight, and cost in comparison to existing waveguide-to-coax adapters and further coax-to-waveguide adapters. Further, the substrate assembly 102 may exhibit a lower profile as compared to existing adapters. In some embodiments, the apparatus 100 may operate when the time-varying electric field signals have frequencies of approximately 20 GHz. Other advantages may exist.

Figure 3A:
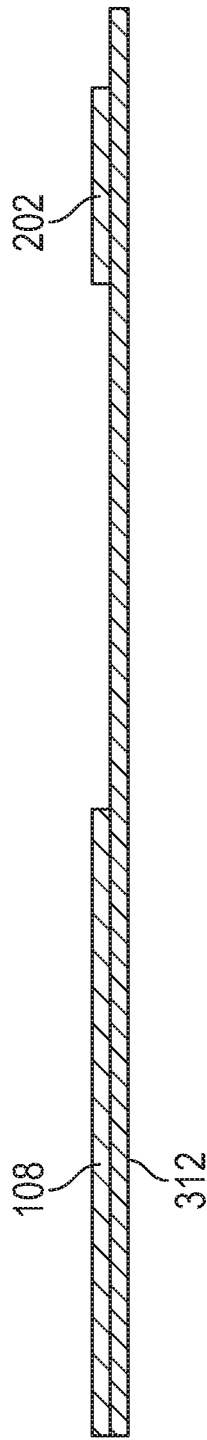
FIG. 3A is a schematic cross-sectional view of an example of a first substrate including a waveguide antenna element and a first conductive plane.
Figure 3B:
FIG. 3B is a schematic cross-sectional view of an example of an optional fourth substrate.
Figure 3C:
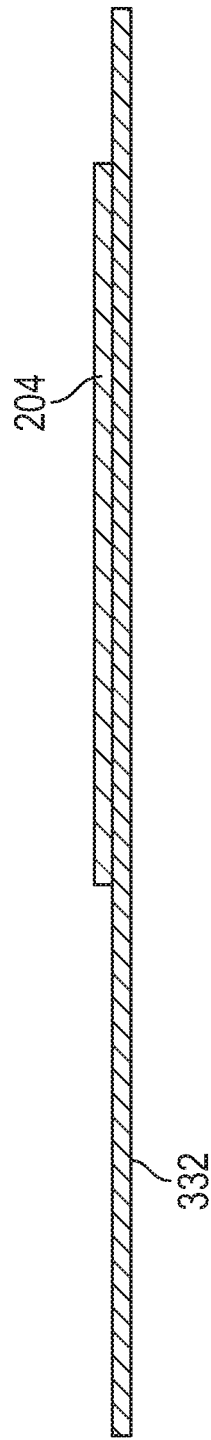
FIG. 3C is a schematic cross-sectional view of an example of a second substrate including a microstrip line.

FIG. 3A is a schematic cross-sectional view of an embodiment of a first substrate 312 having a waveguide antenna element 202 and first conductive plane 108 positioned thereon. FIG. 3B is a schematic cross-sectional view of an embodiment of an optional fourth substrate 322. FIG. 3C is a schematic cross-sectional view of an embodiment of a second substrate 332 with a microstrip line 204 positioned thereon. It should be noted that the microstrip line 204 would only function as a microstrip line when used in conjunction with a conductive plane, as described herein.

Figure 3D:
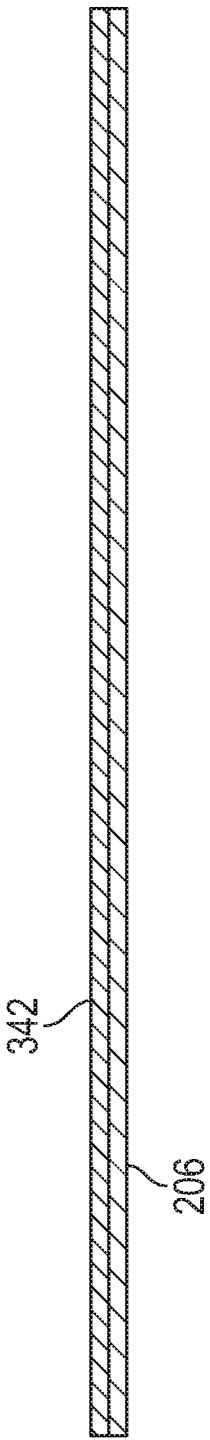
FIG. 3D is a schematic cross-sectional view of an example of a third substrate including a second conductive plane.

FIG. 3D is a schematic cross-sectional view of an embodiment of a third substrate 342 having a second conductive plane 206 positioned thereon.

FIG. 3E is a schematic cross-sectional view of an embodiment of a substrate assembly 102 formed by bonding together the first substrate 312, the second substrate 332, the third substrate 342, and the fourth substrate 322. The substrates 312-342 may be bonded together via a bonding material depicted in FIG. 3E between the substrates 312-342. The bonding material may include adhesive, bonding material, or laminated material as would be appreciated by one of ordinary skill in the art having the benefit of this disclosure. More or fewer layers may be used to form the substrate assembly 102 as would be appreciated by one of ordinary skill in the art having the benefit of this disclosure. Further, the formation of the substrates 312-342 may be performed through additive processes, subtractive processes, or combinations thereof.

FIG. 3F is a schematic cross-sectional view of an embodiment of a substrate assembly 102 having a first plurality of electrical vias 110 formed therein. The first plurality of electrical vias 110 may electrically short the first conductive plane 108 to the second conductive plane 206. Because FIG. 3F is a cross-sectional view, the electrical vias 112 of FIGS. 1 and 2 may not be depicted. However, in practice, the second plurality of electrical vias 112 may be formed similarly to the first set of electrical vias 110 and may electrically short the first conductive plane 108 to the second conductive plane 206. The microstrip line 204 may be positioned between the first substrate 312 and the third substrate 342 and may be connected to the first conductive plane 108 through the connection via 114.

FIG. 3G is a schematic cross-sectional view of an embodiment of a substrate assembly 102. As shown in FIG. 3G, after the substrate assembly 102 is formed, a waveguide 120 may be attached to the first substrate 312 and may encompass the waveguide antenna element 202. As discussed herein, the apparatus 100 may be used to transmit signals to the microstrip line 204 using the waveguide 120. The signals may then be transmitted through a planar surface integrated waveguide defined by the first conductive plane 108, the second conductive plane 206, the first plurality of electrical vias 110, and the second plurality of electrical vias 112.

Figure 4:
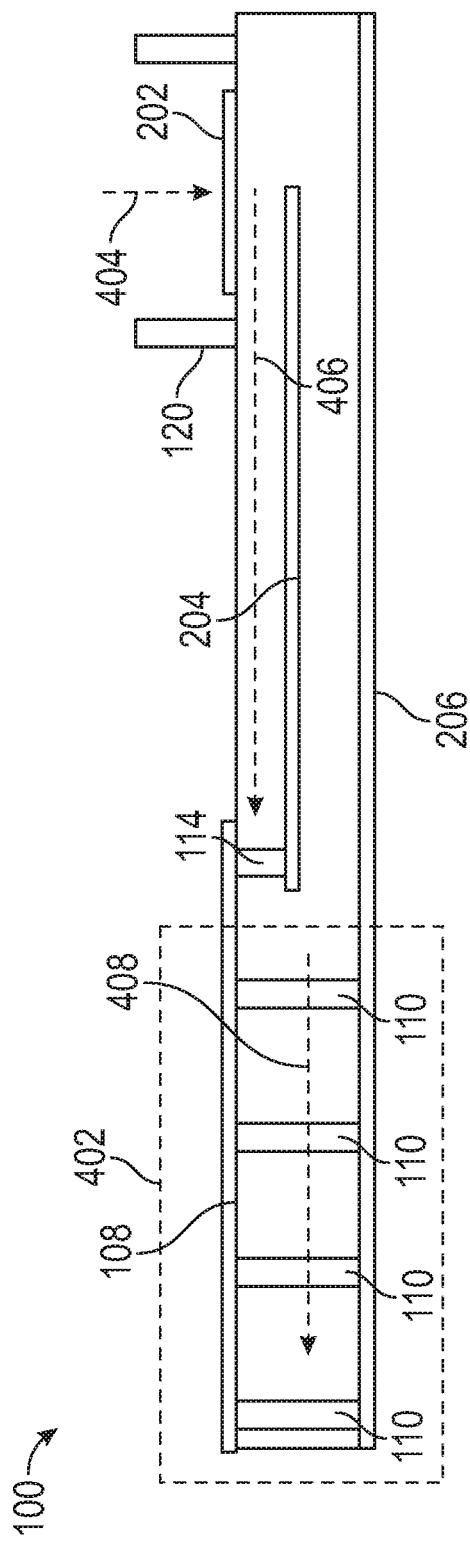
FIG. 4 is a schematic cross-sectional view of an embodiment of a waveguide to planar surface integrated waveguide apparatus and depicting a signal flow.

Referring to FIG. 4, the operation of the apparatus 100 is described. A time-varying electric field signal 404 may be incident to the waveguide antenna element 202 from the waveguide 120. The time-varying electric field signal 404 may ultimately induce a current signal 406 within the microstrip line 204. The first conductive plane 108, the second conductive plane 206, the first plurality of electrical vias 110, and the second plurality of electrical vias 112 may define a planar surface integrated waveguide 402. The current signal 406 may result in a waveguide transmission signal 408 being transmitted through the planar surface integrated waveguide 402. The current signal 406 may have a predetermined operating wavelength and the first plurality of electrical vias 110 may be spaced approximately ⅛ to 1/10 of the operating wavelength from each other to form a sufficient boundary for the planar surface integrated waveguide 402. Likewise, the second plurality of electrical vias 112 (depicted in FIGS. 1 and 2) may be spaced approximately ⅛ to 1/10 of the operating wavelength from each other.

Although FIG. 4 depicted a particular signal flow direction (from the waveguide 120 to the planar surface integrated waveguide 402, the signals may also flow in the other direction (from the planar surface integrated waveguide 402 to the waveguide 120) as would be understood by persons of ordinary skill in the art having the benefit of this disclosure.

A benefit of the apparatus 100 is that the apparatus 100 may have a reduced size, weight, and cost in comparison to existing waveguide-to-coax adapters and further coax-to-stripline adapters. Further, the substrate assembly 102 may exhibit a lower profile as compared to existing adapters.

Figure 5:
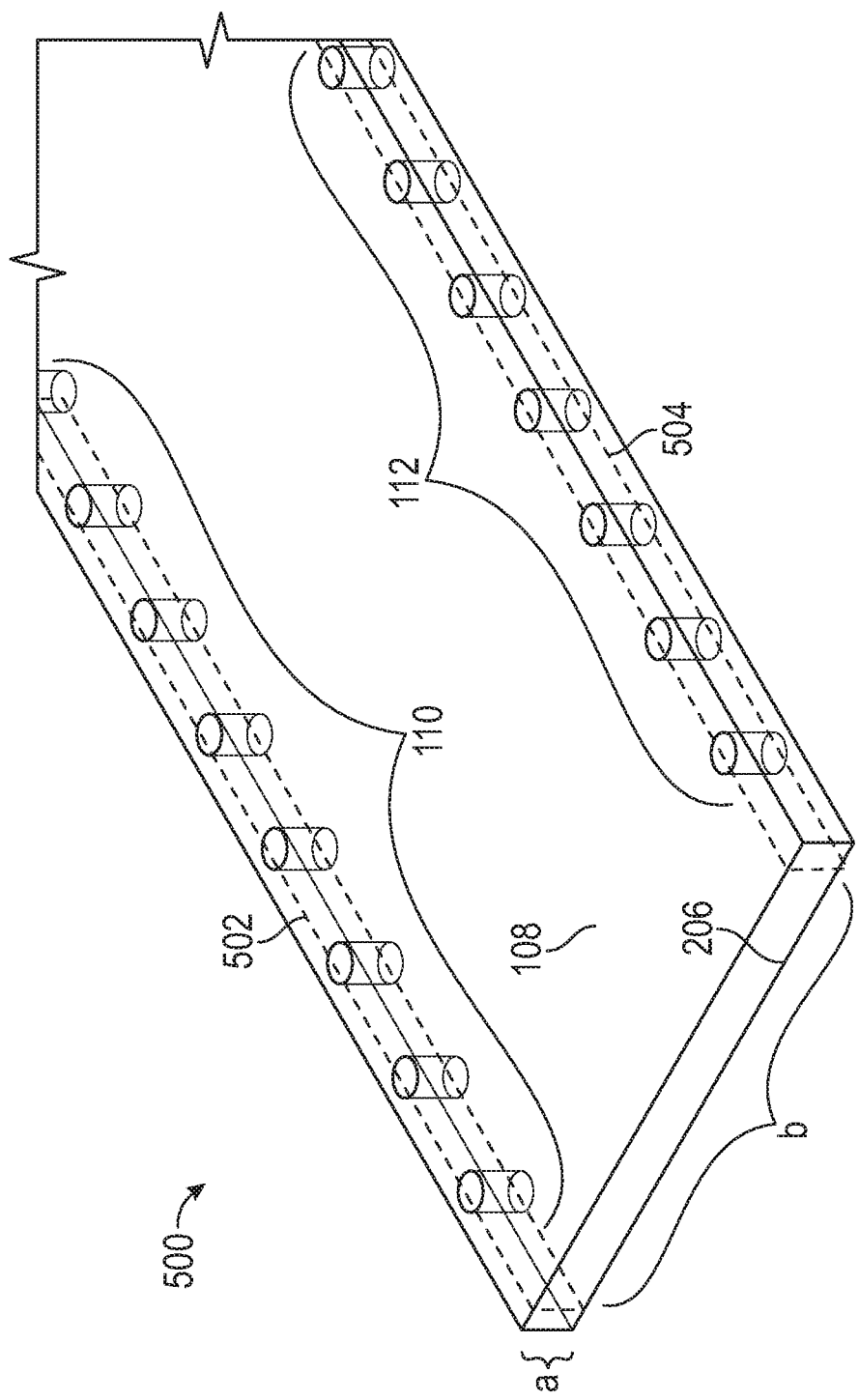
FIG. 5 is a transparent schematic perspective view of an embodiment of a planar surface integrated waveguide.

Referring to FIG. 5, an embodiment of a planar surface integrated waveguide 500 is depicted. The planar surface integrated waveguide 500 may correspond to the planar surface integrated waveguide 402 depicted in FIG. 4. As depicted in FIG. 5, the first plurality of electrical vias 110 are linearly arranged along a first plane 502 and the second plurality of electrical vias 112 are linearly arranged along a second plane 504. The first plane 502 and the second plane 504 may both be perpendicular to the first conductive plane 108 and the second conductive plane 206, respectively, to define a rectangular surface integrated waveguide 500 having height a and width b.

The dimensions a and b, along with a permittivity $\varepsilon_r$ of the dielectric material contained within the planar surface integrated waveguide 500 (the material that forms the substrates 312-342 of FIGS. 3A-3D and any adhesive positioned therebetween) may be associated with an operational cutoff frequency:

$$f_0 = \frac{1}{2\sqrt{\mu\varepsilon}}\sqrt{\left(\frac{1}{a}\right)^2 + \left(\frac{1}{b}\right)^2}$$

which for a non-magnetic material may be rewritten as:

$$f_0 = \frac{c}{2\sqrt{\varepsilon_r}}\sqrt{\left(\frac{1}{a}\right)^2 + \left(\frac{1}{b}\right)^2}$$

where:

$$\mu = \mu_r\mu_0$$

$$\varepsilon = \varepsilon_r\varepsilon_0$$

$$c = \frac{1}{\sqrt{\mu_0\varepsilon_0}}$$

with $\mu_r$ being approximated to 1 for non-magnetic materials.

Figure 6:
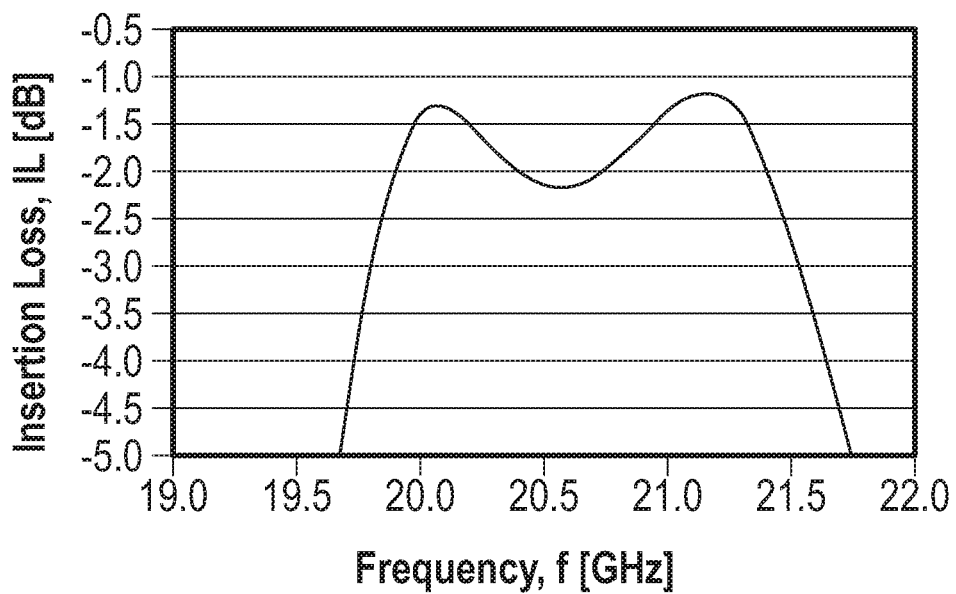
FIG. 6 is a graph depicting an insertion loss associated with an embodiment of a waveguide to planar surface integrated waveguide apparatus.
Figure 7:
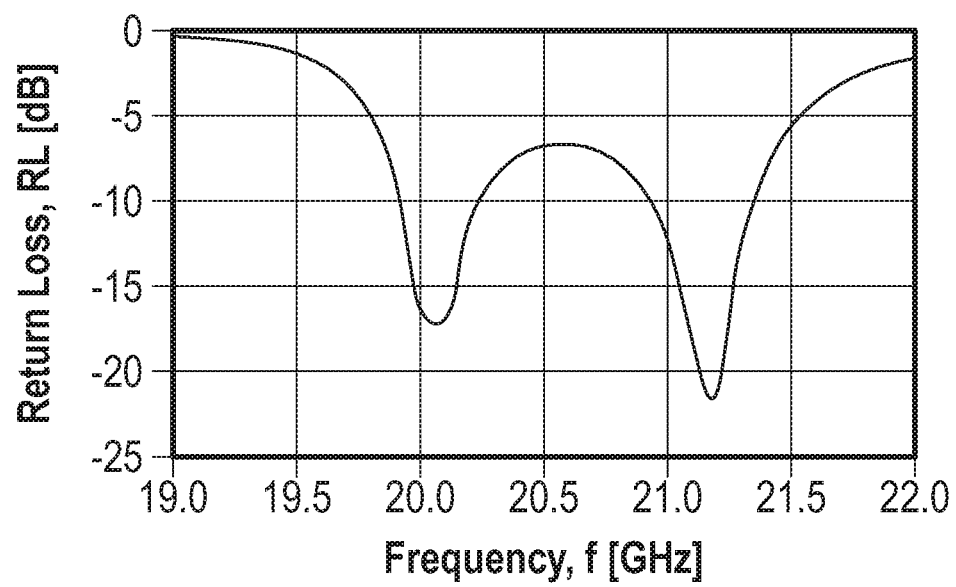
FIG. 7 is a graph depicting a return loss associated with an embodiment of a waveguide to planar surface integrated waveguide apparatus.

Referring to FIGS. 6 and 7, a numerical model of a waveguide to surface integrated waveguide transition was designed to operate near 20 GHz and modeled using a finite element method (FEM) solver to predict the performance. The results show an insertion loss of approximately 1.3 dB with a 3-dB bandwidth of approximately 1.9 GHz and a 3:1 VSWR impedance bandwidth of approximately 1.7 GHz. The results show a return loss of approximately 7 dB at approximately 20.5 GHz.

Figure 8:
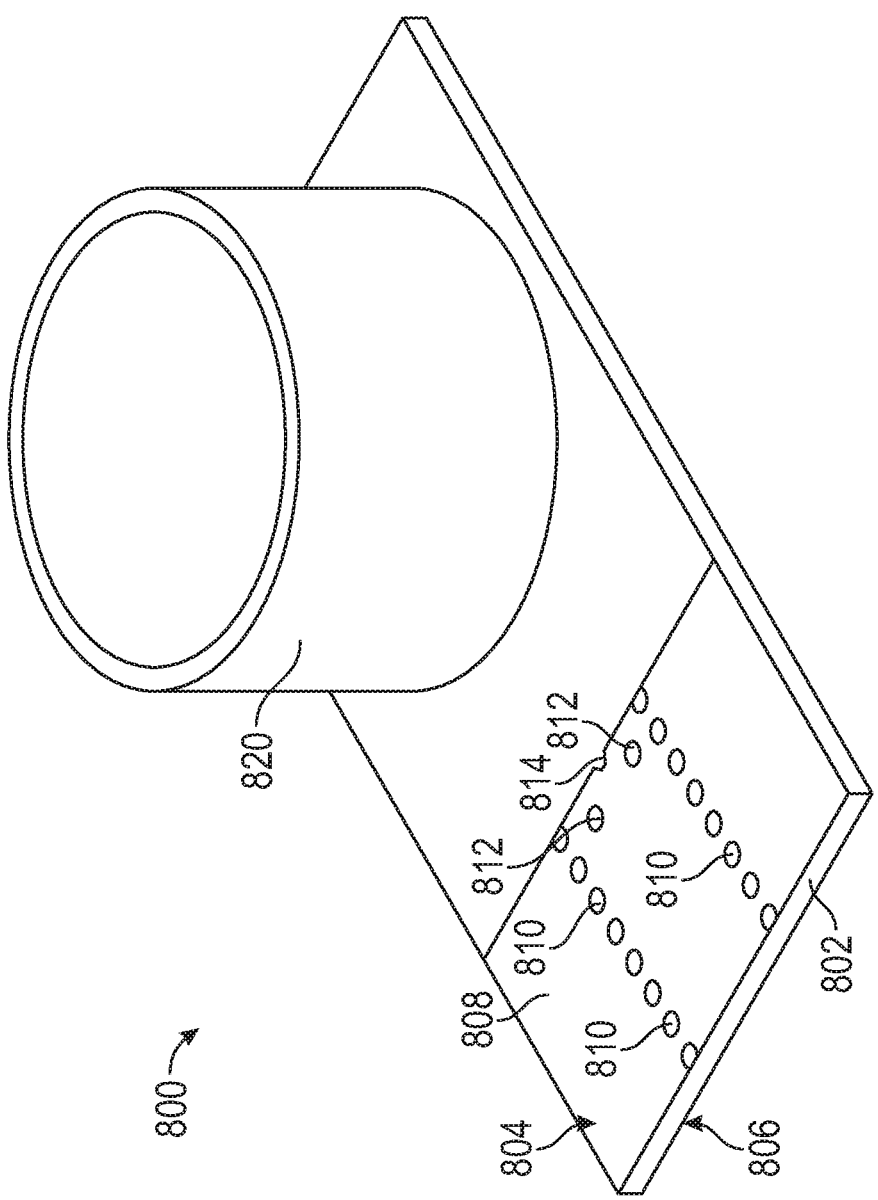
FIG. 8 is a schematic perspective view of an embodiment of a waveguide to planar stripline apparatus.
Figure 9:
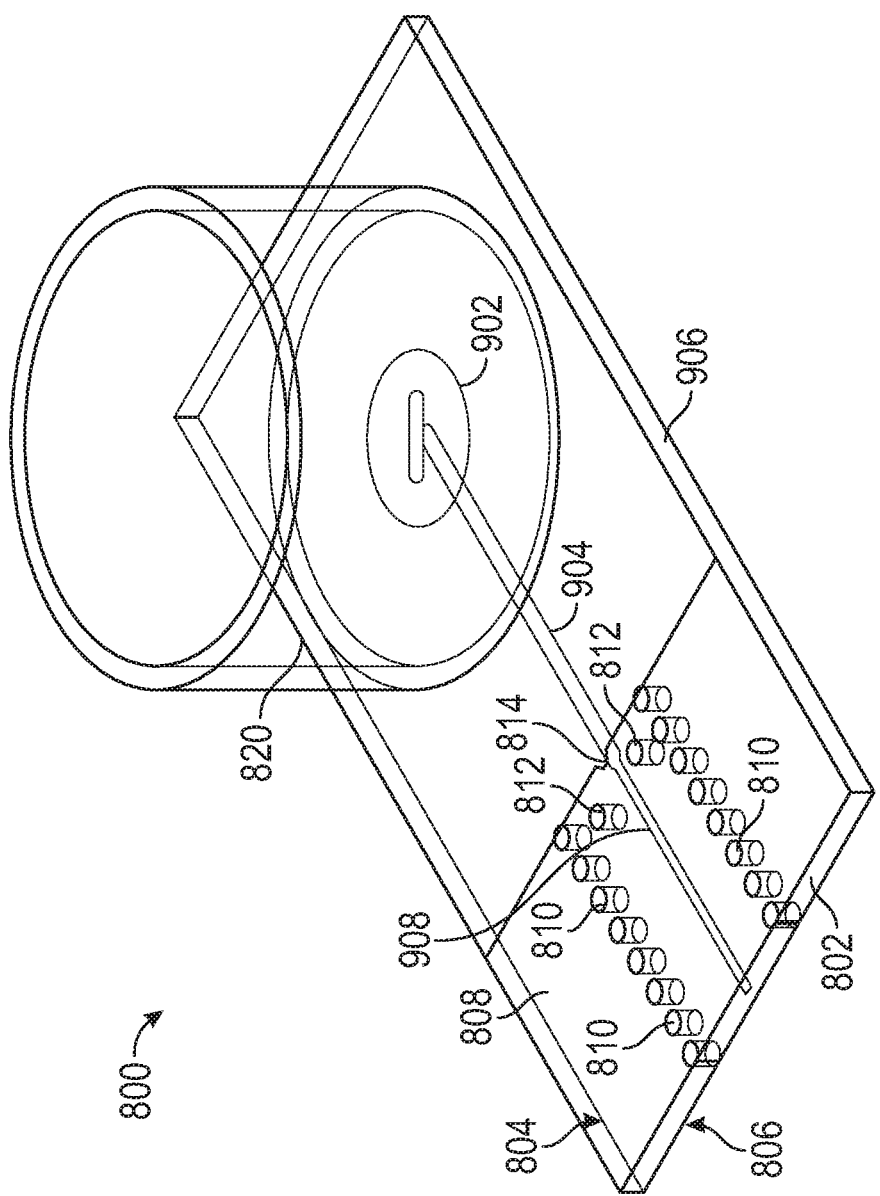
FIG. 9 is a transparent schematic perspective view of an embodiment of a waveguide to planar stripline apparatus.

Referring to FIGS. 8 and 9, an embodiment of a waveguide to stripline apparatus 800 is depicted. The apparatus 800 may include a substrate assembly 802 having a first side 804 and a second side 806. Features positioned on the first side 804 of the substrate assembly 802 may be described with reference to FIG. 8. Features positioned within the substrate assembly 802 or on the second side 806 of the substrate assembly 802 may be described with reference to FIG. 9.

Referring to FIG. 8, on the first side 804 of the substrate assembly 802, the apparatus 800 may include a first conductive plane 808. The first conductive plane 808 may include a notch 814 defined therein. The notch 814 may be used for impedance matching purposes as described herein. A waveguide 820 may also be attached to the first side 804 of the apparatus 800. The waveguide 820 may transition to a microstrip line within the substrate assembly 802 as described further herein. The first conductive plane 808 may cover a portion of the first side 804 of the substrate assembly 802. A plurality of electrical vias 810 may be formed within the substrate assembly 802. The electrical vias 810 may electrically short the first conductive plane 808 to a second conductive plane, effectively forming a dual set of reference ground planes as described herein. The apparatus 800 may also include impedance matching electrical vias 812.

Referring to FIG. 9, the apparatus 800 may include a waveguide antenna element 902. The waveguide antenna element 902 may be a circular waveguide antenna element and may enable a current with circular behavior in response to reception of a signal at the waveguide antenna element 902. The waveguide 820 may be positioned on the first side 804 of the substrate assembly 802 enclosing the waveguide antenna element 902. Although FIGS. 8 and 9 depict the waveguide 120 as a circular waveguide, other shapes, e.g., rectangular, are also possible. Further, the waveguide antenna element 902 may also be other shapes, e.g., rectangular. The waveguide antenna element 902 may also not include a slot.

The apparatus 800 may include a microstrip line 904 within the substrate assembly 802. The microstrip line 904 may be proximity coupled to the waveguide antenna element 902. In other words, the microstrip line 904 may be capacitively coupled with the waveguide antenna element 902 such that a time-varying electrical voltage within the waveguide antenna element 902 may induce a time-varying electrical current within the microstrip line 904 at frequencies within a predetermined frequency band.

On the second side 806 of the substrate assembly 802, the apparatus 800 may include a second conductive plane 906. As persons of skill in the art, having the benefit of this disclosure, would recognize, microstrip lines, in general, are associated with an overlapping reference ground plane on only one side of the microstrip line. In the apparatus 800, the microstrip line 904 may use the second conductive plane 906 acting as a reference ground plane. In order to ensure proper microstrip line functionality, the first conductive plane 808 may be non-overlapping with most of the microstrip line 904.

The apparatus 800 may include a stripline 908 within the substrate assembly 802. The stripline 908 may be electrically connected to the microstrip line 904. The stripline 908 may be characterized in that it is overlapped by both the first conductive plane 808 and the second conductive plane 906. The stripline 908 may have different electrical characteristics than the microstrip line 904. In order to minimize signal loss between the microstrip line 904 and the stripline 908, the notch 814 and the impedance matching electrical vias 812 may perform impedance matching functions. Both the notch 814 and the impedance matching electrical vias 812 may be positioned in proximity to a junction between the microstrip line 904 and the stripline 908. As used herein, the term proximate means that for a predetermined signal frequency, the notch 814 and the impedance matching electrical vias 812 are sufficiently close to the junction to affect the electrical characteristics (e.g., reflection coefficient) at the junction between the microstrip line 904 and the stripline 908. The placement and size of the notch 814 and the impedance matching electrical vias 812 may be determined numerically based on a desired frequency of a signal to be transmitted.

A benefit of the apparatus 800 is that the apparatus 800 may convert a waveguide signal to a microstrip line signal while having a reduced size, weight, and cost in comparison to existing waveguide-to-coax adapters and further coax-to-microstrip adapters. Further, the substrate assembly 802 may exhibit a lower profile as compared to existing adapters. In some embodiments, the apparatus 800 may operate when the time-varying electric field signals have frequencies of approximately 20 GHz. Other advantages may exist.

Figure 10A:
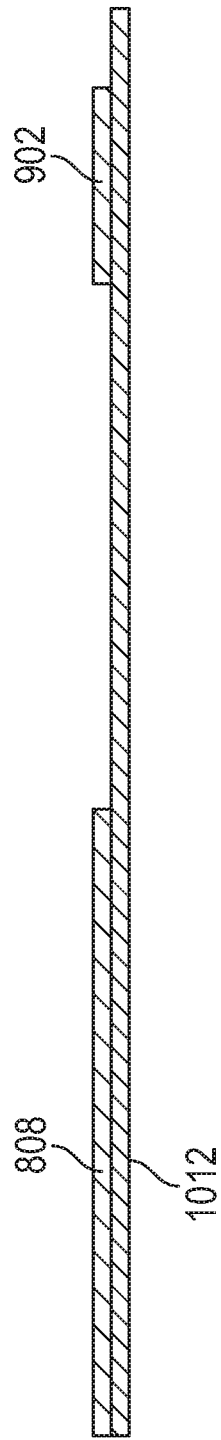
FIG. 10A is a schematic cross-sectional view of an example of a first substrate including a waveguide antenna element and a first conductive plane.
Figure 10B:
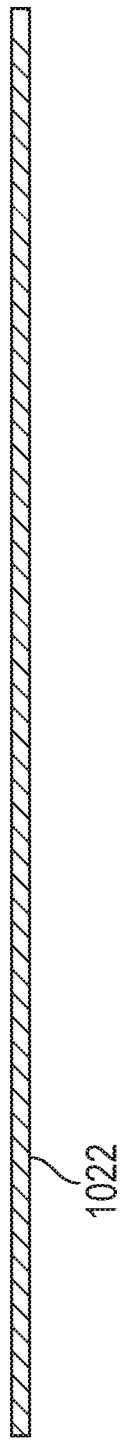
FIG. 10B is a schematic cross-sectional view of an example of an optional fourth substrate.
Figure 10C:
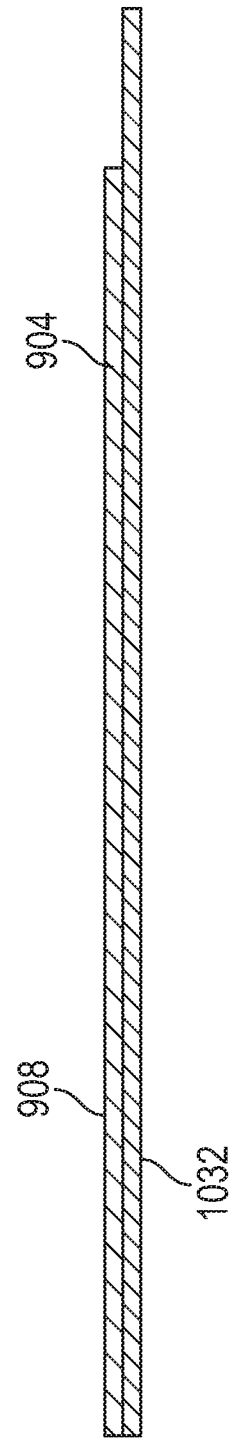
FIG. 10C is a schematic cross-sectional view of an example of a second substrate including a microstrip line and a stripline.
Figure 10D:
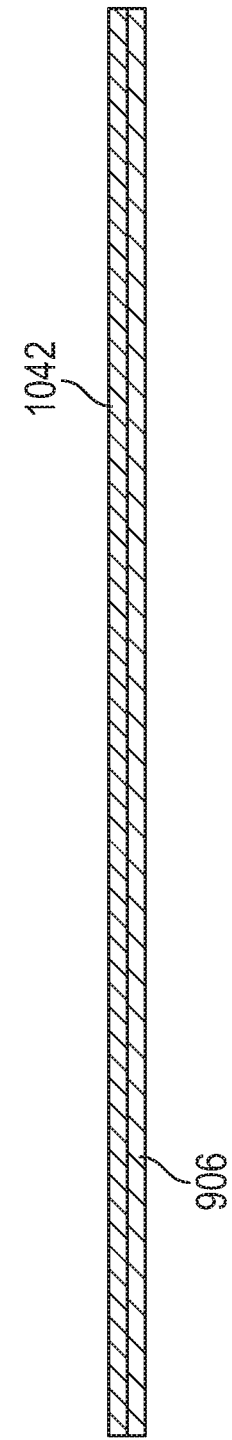
FIG. 10D is a schematic cross-sectional view of an example of a third substrate including a second conductive plane.

FIG. 10A is a schematic cross-sectional view of an embodiment of a first substrate 1012 having a waveguide antenna element 902 and first conductive plane 808 positioned thereon. FIG. 10B is a schematic cross-sectional view of an embodiment of an optional fourth substrate 1022. FIG. 10C is a schematic cross-sectional view of an embodiment of a second substrate 1032 with a microstrip line 904 and a stripline 908 positioned thereon. Both the microstrip line 904 and the stripline 908 may be formed from a single trace. However, the microstrip line 904 would function as a microstrip line when used in conjunction with a conductive plane overlapping on one side, as described herein. Likewise, the stripline 908 would function as a stripline when used in conjunction with overlapping conductive planes on both sides. FIG. 10D is a schematic cross-sectional view of an embodiment of a third substrate 1042 having a second conductive plane 906 positioned thereon.

Figure 10E:
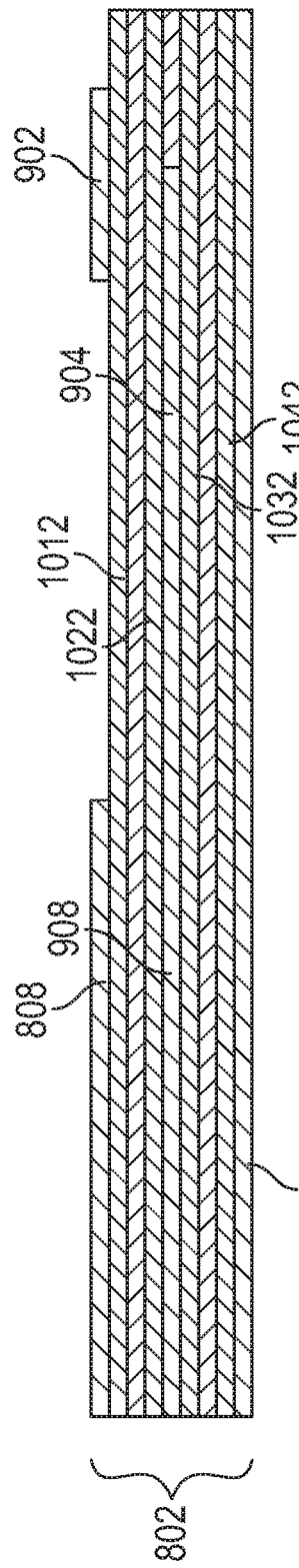
FIG. 10E is a schematic cross-sectional view of an example of a first substrate, second substrate, third substrate, and an optional fourth substrate bonded together to form a substrate assembly.

FIG. 10E is a schematic cross-sectional view of an embodiment of a substrate assembly 802 formed by bonding together the first substrate 1012, the second substrate 1032, the third substrate 1042, and the fourth substrate 1022. The substrates 1012-1042 may be bonded together via a bonding material depicted in FIG. 10E between the substrates 1012-1042. The bonding material may include adhesive, bonding material, or laminated material as would be appreciated by one of ordinary skill in the art having the benefit of this disclosure. More or fewer layers may be used to form the substrate assembly 802 as would be appreciated by one of ordinary skill in the art having the benefit of this disclosure. Further, the formation of the substrates 1012-1042 may be performed through additive processes, subtractive processes, or combinations thereof.

Figure 10F:
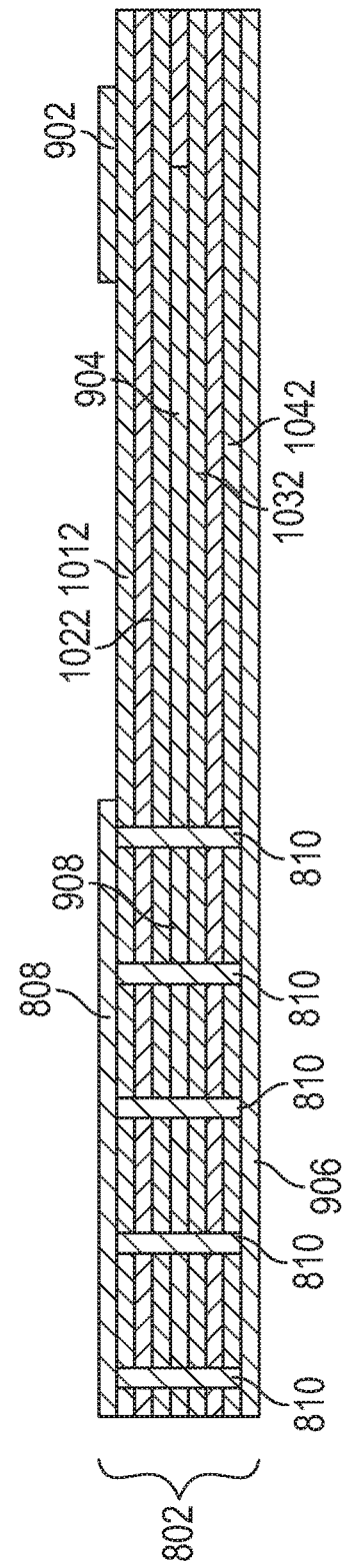
FIG. 10F is a schematic cross-sectional view of an embodiment of a waveguide to planar stripline substrate assembly.

FIG. 10F is a schematic cross-sectional view of an embodiment of a substrate assembly 802 having a plurality of electrical vias 810 formed therein. The plurality of electrical vias 810 may electrically short the first conductive plane 808 to the second conductive plane 906. By electrically shorting the first conductive plane 808 to the second conductive plane 906 a set of two reference ground planes may effectively be created to enable the stripline 908 to function as a stripline.

Figure 10G:
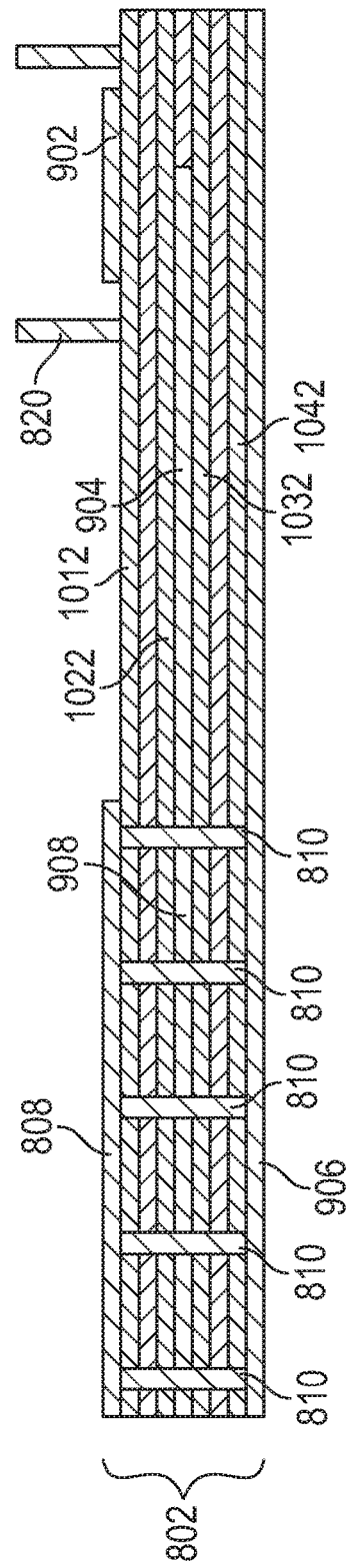
FIG. 10G is a schematic cross-sectional view of an embodiment of a waveguide to planar stripline substrate assembly.

FIG. 10G is a schematic cross-sectional view of an embodiment of a substrate assembly 802. As shown in FIG. 10G, after the substrate assembly 802 is formed, a waveguide 820 may be attached to the first substrate 1012 and may encompass the waveguide antenna element 902. As discussed herein, the apparatus 800 may be used to transmit signals to the microstrip line 904 using the waveguide 820. The signals may then be transmitted through the stripline 908.

Figure 11:
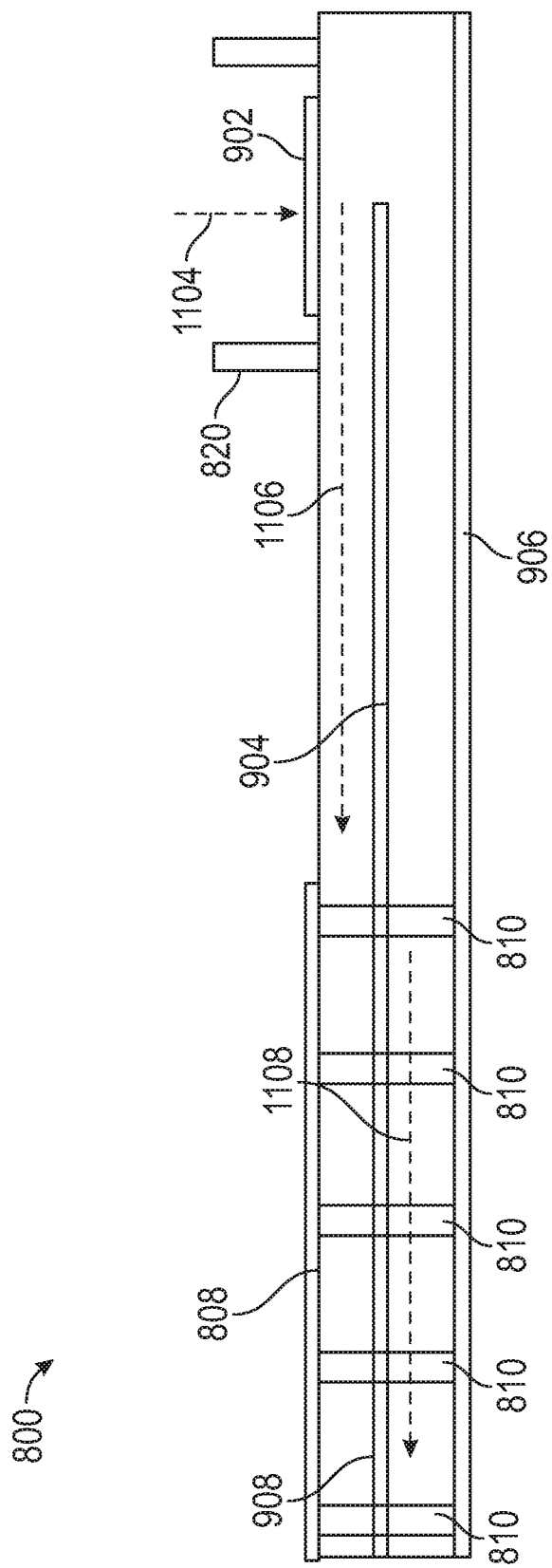
FIG. 11 is a schematic cross-sectional view of an embodiment of a waveguide to planar stripline apparatus and depicting a signal flow.

Referring to FIG. 11, the operation of the apparatus 800 is described. A time-varying electric field signal 1104 may be incident to the waveguide antenna element 902 from the waveguide 820. The time-varying electric field signal 1104 may ultimately induce a current signal 1106 within the microstrip line 904. The microstrip line 904 may transition to a stripline 908 when it passes between both the first conductive plane 808 and the second conductive plane 906 with the current signal 1106 transitioning into a stripline signal 1108.

Although FIG. 11 depicts a particular signal flow direction (from the waveguide 820 to the stripline 908, the signals may also flow in the other direction (from the stripline 908 to the waveguide 820) as would be understood by persons of ordinary skill in the art having the benefit of this disclosure. A benefit of the apparatus 800 is that it may have a reduced size, weight, and cost in comparison to existing waveguide-to-coax adapters and further coax-to-stripline adapters. Other benefits may exist.

Figure 12:
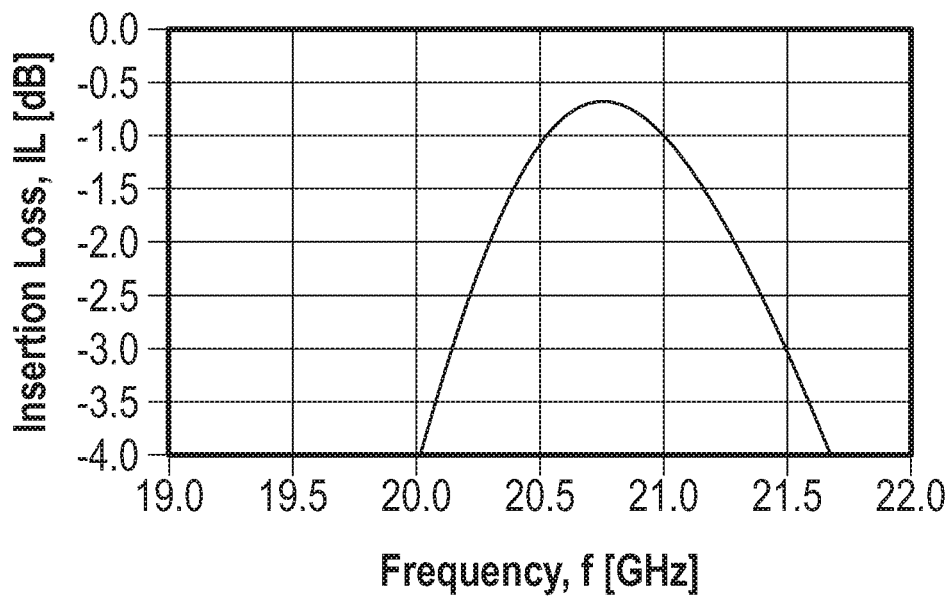
FIG. 12 is a graph depicting an insertion loss associated with an embodiment of a waveguide to planar stripline apparatus.
Figure 13:
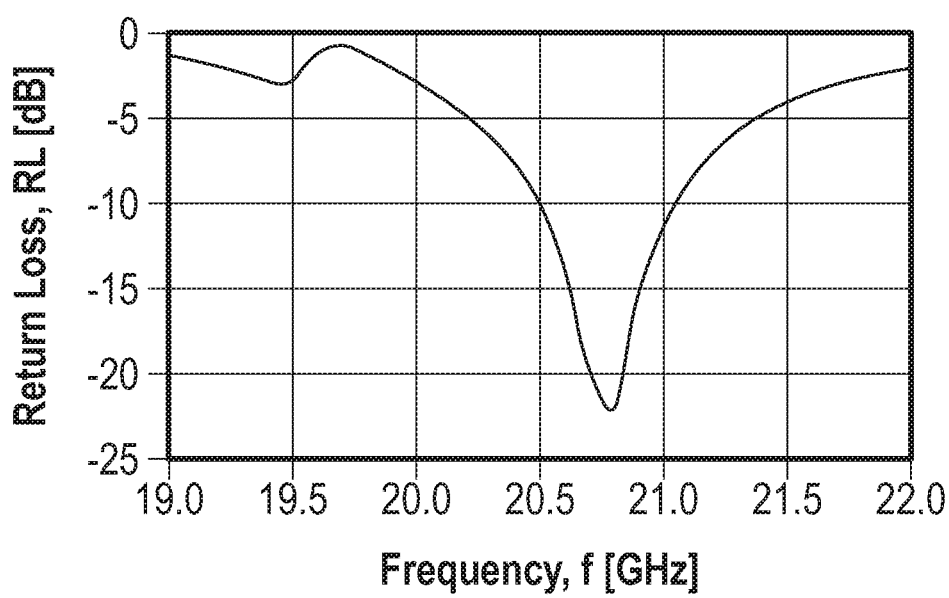
FIG. 13 is a graph depicting a return loss associated with an embodiment of a waveguide to planar stripline apparatus.

Referring to FIGS. 12 and 13, a numerical model of a waveguide to planar stripline transition designed to operate near 20 GHz was developed using an FEM solver to predict the performance. The results show an insertion loss of approximately 0.7 dB with a 3-dB bandwidth of approximately 1.5 GHz and a 3:1 VSWR impedance bandwidth of approximately 950 MHz. The results further show a return loss of approximately 23 dB at about 20.7 GHz.

Figure 14:
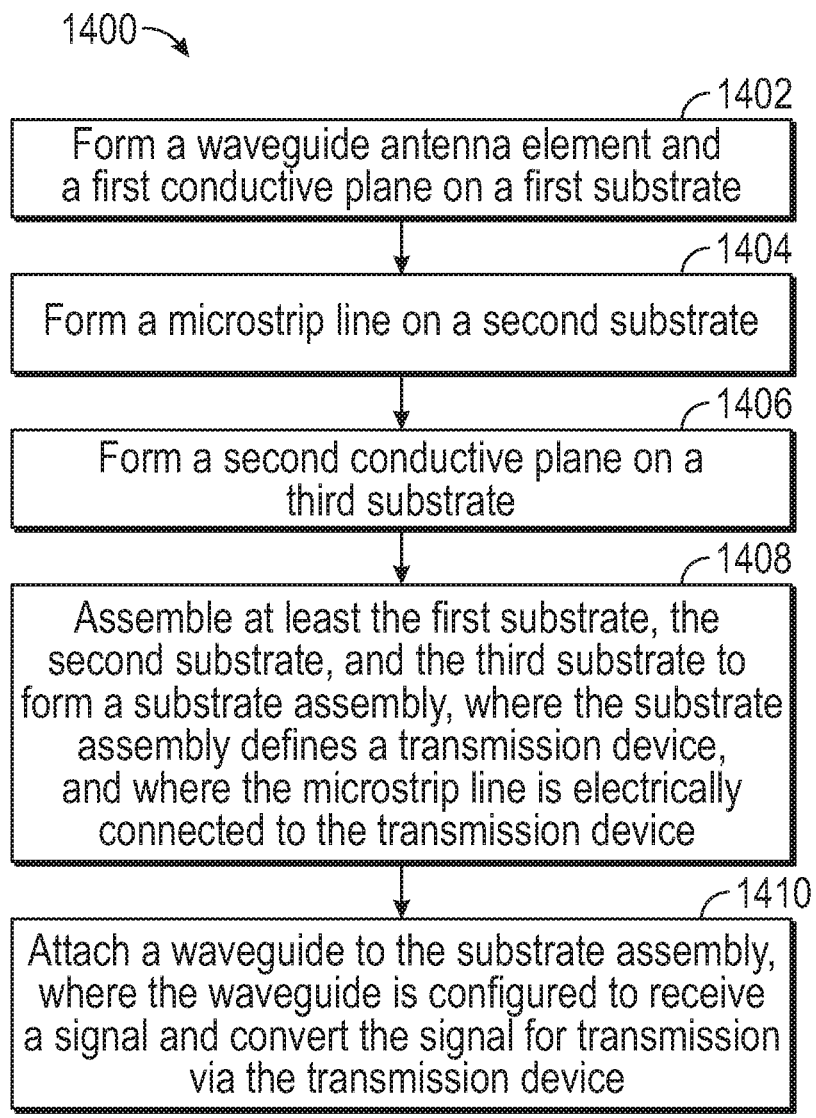
FIG. 14 is a flowchart depicting a method for waveguide to transmission device transition.

Referring to FIG. 14, an embodiment of a method 1400 for waveguide to transmission device transition is depicted. The method 1400 may include forming a waveguide antenna element and a first conductive plane on a first substrate, at 1402. For example, the waveguide antenna element 202 and the first conductive plane 108 may be formed on the first substrate 312. As another example, the waveguide antenna element 902 and the first conductive plane 808 may be formed on the first substrate 1012.

The method 1400 may further include forming a microstrip line on a second substrate, at 1404. For example, the microstrip line 204 may be formed on the second substrate 332. As another example, the microstrip line 904 may be formed on the second substrate 1032.

The method 1400 may also include forming a second conductive plane on a third substrate, at 1406. For example, the second conductive plane 206 may be formed on the substrate 342. As another example, the second conductive plane 906 may be formed on the third substrate 1042.

The method 1400 may include assembling at least the first substrate, the second substrate, and the third substrate to form a substrate assembly, where the substrate assembly defines a transmission device, and where the microstrip line is electrically connected to the transmission device, at 1408. For example, the first substrate 312, the second substrate 332, and the third substrate 342 may be assembled to form the substrate assembly 102 to form the planar surface integrated waveguide 402. As another example, the first substrate 1012, the second substrate 1032, and the third substrate 1042 may be assembled to form the substrate assembly 802 to form the stripline 908, with the first conductive plane 808 and the second conductive plane 906 acting as reference ground planes.

The method 1400 may further include attaching a waveguide to the substrate assembly, where the waveguide is configured to receiving a signal and convert the signal for transmission via the transmission device, at 1410. For example, the waveguide 120 may be attached to the substrate assembly 102. As another example, the waveguide 820 may be attached to the substrate assembly 802.

A benefit of the method 1400 is that signal conversion may be performed with fewer resources (e.g., size, weight, and cost) as compared to existing waveguide-to-coax conversions and conversions to further transmission devices. Other advantages may exist.

Although various embodiments have been shown and described, the present disclosure is not so limited and will be understood to include all such modifications and variations as would be apparent to one skilled in the art.

What is claimed is:

1. An apparatus comprising:
a substrate assembly having a first side and a second side;
a waveguide antenna element positioned on the first side of the substrate assembly;
a microstrip line positioned within the substrate assembly, wherein the waveguide antenna element overlaps the microstrip line;
a first conductive plane positioned on the first side of the substrate assembly;
a second conductive plane positioned on the second side of the substrate assembly;
a first plurality of electrical vias electrically shorting the first conductive plane and the second conductive plane; and
a second plurality of electrical vias electrically shorting the first conductive plane and the second conductive plane, wherein the first conductive plane, the second conductive plane, the first plurality of electrical vias, and the second plurality of electrical vias define a surface integrated waveguide, and wherein the microstrip line is electrically connected to the surface integrated waveguide.

2. The apparatus of claim 1, wherein the microstrip line is electrically shorted to the first conductive plane, the second conductive plane, or both.

3. The apparatus of claim 1, wherein the first plurality of electrical vias are linearly arranged along a first plane and the second plurality of electrical vias are linearly arranged along a second plane, and wherein the first plane and the second plane are both perpendicular to the first conductive plane and the second conductive plane, respectively, to define a rectangular surface integrated waveguide.

4. The apparatus of claim 1, wherein the microstrip line is configured to propagate a signal having a predetermined operating wavelength, wherein the first plurality of electrical vias are spaced approximately ⅛ to 1/10 of the predetermined operating wavelength from each other, and wherein the second plurality of electrical vias are spaced approximately ⅛ to 1/10 of the predetermined operating wavelength from each other.

5. The apparatus of claim 1, wherein the waveguide antenna element is proximity coupled to the microstrip line.

6. The apparatus of claim 1, further comprising:
a waveguide attached to the first side of the substrate assembly and enclosing the waveguide antenna element.

7. The apparatus of claim 1, wherein the waveguide antenna element and the first conductive plane are positioned on a first substrate of the substrate assembly, wherein the microstrip line is positioned on a second substrate of the substrate assembly, and wherein the second conductive plane is positioned on a third substrate of the substrate assembly.

8. An apparatus comprising:
a substrate assembly having a first side and a second side;
a waveguide antenna element positioned on the first side of the substrate assembly;
a microstrip line positioned within the substrate assembly, wherein the waveguide antenna element overlaps the microstrip line;
a stripline positioned within the substrate assembly and electrically connected to the microstrip line;
a first conductive plane positioned on the first side of the substrate assembly and overlapping the stripline; and
a second conductive plane positioned on the second side of the substrate assembly and overlapping both the microstrip line and the stripline.

9. The apparatus of claim 8, further comprising:
a notch defined in the first conductive plane, wherein the notch is proximate to a junction between the stripline and the microstrip line, and wherein the notch is configured to perform impedance matching functions between the stripline and the microstrip line.

10. The apparatus of claim 8, further comprising:
at least one electrical via electrically shorted to the first conductive plane, the second conductive plane, or both, wherein the at least one electrical via is proximate to a junction between the stripline and the microstrip line, and wherein the at least one electrical via is configured to perform impedance matching functions between the stripline and the microstrip line.

11. The apparatus of claim 8, further comprising:
a plurality of electrical vias electrically shorting the first conductive plane to the second conductive plane.

12. The apparatus of claim 8, wherein the waveguide antenna element is proximity coupled to the microstrip line.

13. The apparatus of claim 8, further comprising:
a waveguide attached to the first side of the substrate assembly and enclosing the waveguide antenna element.

14. The apparatus of claim 8, wherein the waveguide antenna element and the first conductive plane are positioned on a first substrate of the substrate assembly, wherein the microstrip line and the stripline are positioned on a second substrate of the substrate assembly, and wherein the second conductive plane is positioned on a third substrate of the substrate assembly.

15. A method comprising:
forming a waveguide antenna element and a first conductive plane on a first substrate;
forming a microstrip line on a second substrate;
forming a second conductive plane on a third substrate; and
assembling at least the first substrate, the second substrate, and the third substrate to form a substrate assembly, wherein the substrate assembly defines a transmission device, and wherein the microstrip line is electrically connected to the transmission device.

16. The method of claim 15, wherein the transmission device is a surface integrated waveguide.

17. The method of claim 16, further comprising:
forming a first plurality of electrical vias electrically shorting the first conductive plane and the second conductive plane;
forming a second plurality of electrical vias electrically shorting the first conductive plane and the second conductive plane, wherein the first conductive plane, the second conductive plane, the first plurality of electrical vias, and the second plurality of electrical vias define the surface integrated waveguide; and
electrically connecting the microstrip line to the first conductive plane, the second conductive plane, or both.

18. The method of claim 15, further comprising:
forming a stripline on the second substrate, wherein the stripline is electrically connected to the microstrip line;
forming a notch in the first conductive plane proximate to a junction of the stripline and the microstrip line; and
forming one or more electrical vias proximate to the junction of the stripline and the microstrip line.

19. The method of claim 15, further comprising:
attaching a waveguide to the substrate assembly, wherein the waveguide is configured to receive a signal and convert the signal for transmission via the transmission device.

20. The method of claim 15, wherein the waveguide antenna element is proximity coupled to the microstrip line.

* * * * *